United States Patent [19]

Broding

[11] Patent Number: 4,524,433

[45] Date of Patent: Jun. 18, 1985

[54] HIGH SPEED SONIC LOGGING USING MULTIPLE TRANSDUCERS

[75] Inventor: Robert A. Broding, Tulsa, Okla.

[73] Assignee: Standard Oil Company (Indiana), Chicago, Ill.

[21] Appl. No.: 524,487

[22] Filed: Aug. 18, 1983

Related U.S. Application Data

[63] Continuation of Ser. No. 242,501, Mar. 10, 1981, abandoned.

[51] Int. Cl.³ .............................................. G01V 1/40
[52] U.S. Cl. ........................................ 367/25; 367/27; 367/28; 367/32; 367/35; 367/86; 181/105
[58] Field of Search ................. 181/104, 105; 367/11, 367/28, 29, 32, 34, 35, 69, 71, 78–80, 86, 101, 27, 30, 25; 340/858, 861; 73/152

[56] References Cited

U.S. PATENT DOCUMENTS

| | | | |
|---|---|---|---|
| 3,237,153 | 2/1966 | Blizard | 340/861 |
| 3,378,097 | 4/1968 | Straus et al. | 367/86 |
| 3,426,865 | 2/1969 | Henry | 367/86 |
| 3,959,767 | 5/1976 | Smither et al. | 340/858 |
| 4,283,953 | 8/1981 | Plona | 367/86 |

FOREIGN PATENT DOCUMENTS

| | | |
|---|---|---|
| 1172385 | 11/1969 | United Kingdom. |
| 1390998 | 4/1975 | United Kingdom. |
| 1474741 | 5/1977 | United Kingdom. |
| 1495279 | 12/1977 | United Kingdom. |
| 2020023 | 11/1979 | United Kingdom. |
| 2043898 | 10/1980 | United Kingdom. |

*Primary Examiner*—T. H. Tubbesing
*Assistant Examiner*—K. R. Kaiser

[57] ABSTRACT

In an acoustic logging system for providing information regarding selected parameters of the wall of a borehole in the earth, and of the rock formation which is adjacent the borehole, in which a single transmit/receive transducer system (T/RTS) mounted on a rotating assembly probes the wall of the borehole in a circular scanning pattern as a function of depth, the improvement which includes at least a second T/RTS mounted on the rotating assembly in known geometrical relation to the first T/RTS, and means to process two or more analog electrical scan signals for transmission over one or more electrical transmission channels in a logging cable. In particular, methods and means are described for transmitting multiple scan signals whereby a higher speed of logging is possible without loss of detail of the logs and without modification of the mechanical system of the logging sonde.

11 Claims, 9 Drawing Figures

HIGH SPEED SONIC LOGGING USING MULTIPLE TRANSDUCERS

CROSS-REFERENCE TO RELATED APPLICATIONS

This is a continuation of copending application Ser. No. 242,501, filed Mar. 10, 1981, now abandoned.

It is related to my co-pending application, Ser. No. 242,497 filed Mar. 10, 1981, entitled: "BOREHOLE TELEVIEWER SYSTEM USING MULTIPLE TRANSDUCER SUBSYSTEMS" and to Ser. No. 242,220, filed Mar. 10, 1981, now abondoned, entitled: "TRANSMITTING MULTIPLE BOREHOLE PARAMETERS IN SONIC LOGGING".

BACKGROUND OF THE INVENTION

1. Field of the Invention

This invention lies in the field of sonic logging systems for boreholes. More particularly, it is concerned with the logging of deep boreholes in the earth. Still more particularly, it concerns the use of a sonic transducer which transmit a beam of high frequency acoustic energy into the borehole wall directed in a radial plane, and receives the returned reflected acoustical energy signal from a reflecting surface, such as the wall of the borehole, and transmits a processed electrical scan signal derived from such received signal, to the surface of the earth, through the cable which supports the instrument, or sonde, for further processing.

Still more particularly, it concerns improvements in such logging devices, and in particular, the use of two or more transducer systems on a single rotating assembly so that multiple probing signals are sent outwardly from the axis of the borehole and multiple reflected sonic signals are received, converted to electrical scan signals, which are then utilized in various ways.

Still more particularly, this invention concerns improvements in methods and apparatus for processing multiple simultaneous analog electrical scan signals (ESS) in the sonde for transmission to the surface in real time, over conventional logging cables which may have only a single, or possibly only two conventional intermediate frequency signal transmission channels.

Still more particularly, this invention concerns improvements in such logging devices whereby with multiple transducers, the logging sonde can be traversed at higher speed without losing any detail of the sonic log.

2. Description of the Prior Art

This field of science and engineering is not new. It has been in useful operation in the logging of boreholes in the earth, such as oil and gas wells, for a number of years. There are various patents issued on selected features of these systems, and including the basic system, which form no part of this invention.

Examples of the prior art are illustrated by U.S. Pat. No. 3,369,626, entitled: "METHOD OF AND APPARATUS FOR PRODUCING A VISUAL RECORD OF PHYSICAL CONDITIONS OF MATERIALS TRAVERSED BY A BOREHOLE", issued Feb. 20, 1968 in the name of J. Zemanek, Jr. There is also U.S. Pat. No. 3,668,619, entitled: "THREE-DIMENSIONAL PRESENTATION OF BOREHOLE LOGGING DATA", patented June 6, 1972 in the name of Charles L. Dennis; U.S. Pat. No. 3,550,075, entitled: "SYSTEM FOR DISPLAYING TIME INFORMATION IN ACOUSTIC WELL LOGGING SYSTEM", issued Dec. 22, 1970 in the name of D. W. Hilchie et al; and U.S. Pat. No. 3,836,953, entitled: "ACOUSTIC CALIPER LOGGING", issued Sept. 17, 1974 in the name of Jerald C. Summers. There is also additional art recorded in the form of other patents, and in technical papers presented at technical society meetings, so that further description or statement of the art is not necessary at this time.

SUMMARY OF THE INVENTION

In my co-pending application, Ser. No. 242,497, filed Mar. 10, 1981, it was a primary object to provide a number of improvements in the design and construction of borehole logging instruments employing acoustical probing beams, and reflected sonic signals, and to provide at least two or more transmitter/receiver transducer systems (T/RTS) operating independently to provide multiple electrical scan signals, which are used cooperatively, in combination, to provide more information than would be possible by their separate use.

It is a primary objective of this invention to provide apparatus and methods for processing multiple ESS in a sonde for improved transmission over single or double transmission channels in conventional electrical logging cables.

It is a further object of this invention to provide apparatus and methods, using multiple sonic transducers to obtain faster logging without loss of detail of the sonic log.

In this invention the improvement lies in the apparatus and methods of processing and combining the analog electrical scan signals from two or more T/RTS. These are mounted on the same rotating assembly as the normal single T/RTS, in known geometrical relationships to each other. There may be two, three, four or more T/RTS and these each may have the same electrical characteristics or they may each be different from the others. By the use of different T/RTS, it is possible to probe into the earth to a deeper or shallower depth, depending upon the characteristic and the frequency of the T/RTS. For example, one of the problems of the conventional system is that it has a high frequency T/RTS, and high frequency sonic waves in the fluid in the well, such as drilling mud, suffer a high attenuation. Thus, the depth of penetration of the sonic beam is limited by this attenuation, due to the fact that the sonic waves must travel a selected distance through the mud, or other fluid in the well bore. By making the T/RTS of a lower frequency, the attenuation becomes less, and thus the sonic beam probes to a greater range, or radial distance from the transducer into the rock wall.

With a plurality of similar transducers, arranged in a common plane transverse to the axis of the rotating assembly of the sonde, equally spaced circumferentially, a plurality of scans are made simultaneously, as the sonde is moved vertically at a selected constant rate. Thus, a shorter vertical spacing along the wall of the borehole is provided for each scan. This permits a much finer detail of scanning or probing. Conversely, it permits a higher rate of logging to get the same spacing of scan or probe traces.

The arrangement of multiple T/RTS can be in a horizontal plane circumferentially spaced, or in a vertical plane longitudinally spaced. This use of arrays of T/RTS will provide a stronger, better-focused scanning beam, of higher energy. Thus, the penetration of the beam can be greatly increased.

The basic problem is, however, how can these multiple ESS be transmitted to the surface by the use of logging cables which were originally designed for transmitting relatively low frequency electrical logging signals, and so on, that is, signals of less than about 50 KHZ.

The apparatus and methods of processing the multiple ESS form the subject of this invention. The particular apparatus design depends on a number of factors, such as:

(a) the number of separate T/RTS and resulting ESS;
(b) whether the frequencies of the T/RTS are the same or different;
(c) whether the complete received signals are required, or simply measurements of amplitude of reflection, and time of travel, or depth of penetration, or caliper;
(d) whether selective portions of each of say two ESS can be gated to combine the two portions as a single signal;
(e) whether a single transmission channel is provided in the cable, or more parallel channels;
(f) the nature of the transmission channels, that is, their frequency pass bands; and so on.

BRIEF DESCRIPTION OF THE DRAWINGS

These and other objects and advantages of this invention and a better understanding of the principles and details of the invention will be evident from the following description taken in conjunction with the appended drawings, in which.

DETAILED DESCRIPTION OF THE PREFERRED EMBODIMENT

Definitions:

There are a number of words designating elements or parts of the invention that will be used frequently during the following description. I propose to define these in advance so that words may be saved in the description.

1. Sonde. This is a sealed logging instrument that contains the transducers and the control and power means for driving the transducers.

2. Rotating Assembly or Drum. This is the assembly in the sonde on which the transducers are mounted, and which rotates about the axis of the sonde.

3. Transmit/Receive Transducer Systems (T/RTS). These are the means to generate a sonic beam responsive to the application of a high voltage pulse to a transducer. In some instances the sonic generator can also be used as a sonic wave detector. In other instances, one of a pair of transducers is used as a detector.

4. Analog Electrical Scan Signal. This is the received sonic reflection of a transmitted sonic beam, which has been passed through a detector and converted to a unidirectional analog signal representative of the amplitude of the reflected signal as a function of time.

5. While the principal use of this sonde is in logging vertical boreholes in the earth, they can equally well be used in horizontal boreholes, etc. The proper word to use for indicating the position of two parts spaced along the axis is longitudinal, but the word vertical will be used when convenient.

Figure 1:
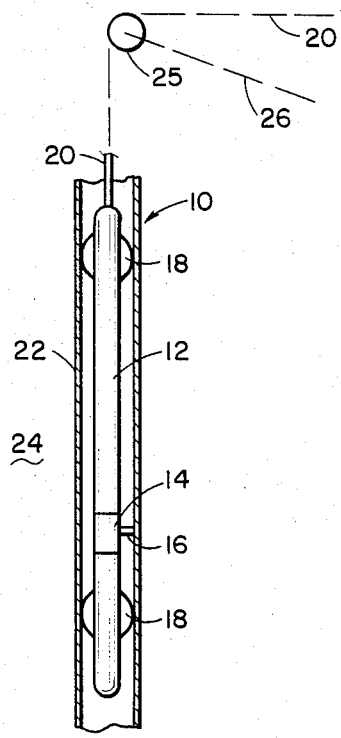
FIG. 1 illustrates the prior art simply in the arrangement of the logging sonde held concentric with the well bore by means of radio centering springs and supported by a cable which runs over a measuring wheel, the rotations of which are functions of depth.
Figure 2:
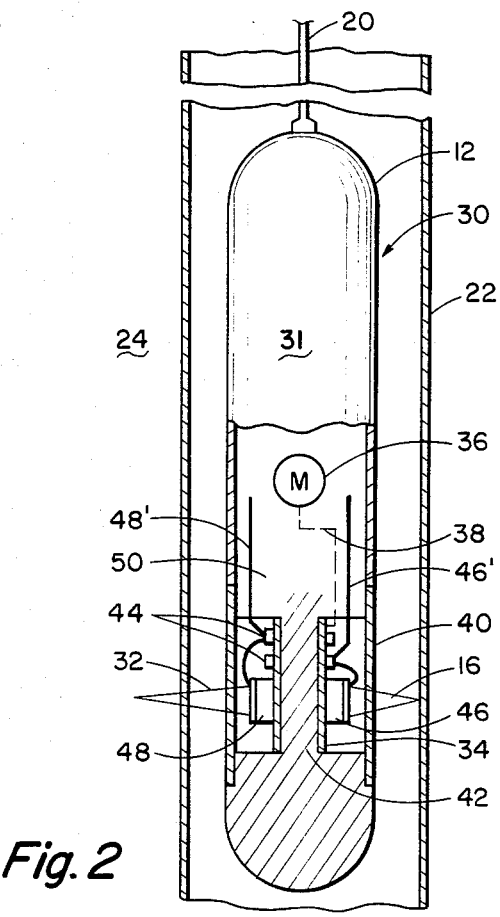
FIG. 2 illustrates one embodiment of this invention employing two T/RTS arranged 180° apart in a horizontal plane on the rotating assembly.
Figure 3:
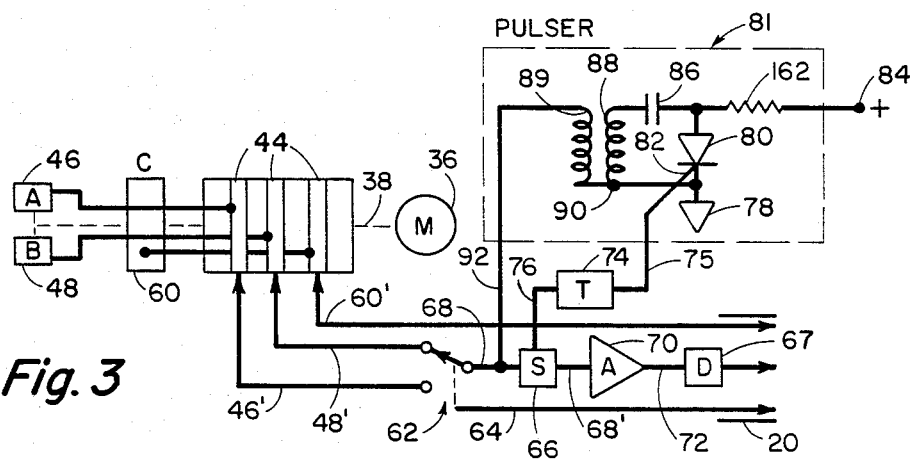
FIG. 3 illustrates one method of utilizing the two T/RTS of FIG. 2.

Refer now to the drawings and to FIGS. 1, 2, and 3, which are taken from my co-pending application, Ser. No. 242,497. FIG. 1 is indicated as prior art and is indicated generally by the numeral 10. A logging sonde 12 is supported in a vertical borehole 22 by means of a cable 20 shown passing around a measuring wheel 25 at the surface. The rotations of the wheel 25 measure the length of cable that has passed over the wheel. The rotations of the wheel 25 are transmitted by means 26, through an appropriate drive system, to control the movement in the direction representing verticality, in any display system that might be used. A section of the sonde indicated by numeral 14 rotates by motor means in the sonde, at a selected constant rate. A probing beam of sonic energy 16 passes out radially from the rotating portion 14 to probe the wall and provide information regarding the character and the parameters of the wall 22, and the material of which the wall is composed. This wall might be a steel casing surrounded by cement in a drilled borehole in a rock formation, or it might be an open borehole.

Referring now to FIG. 2, there is shown, to a larger scale, a view of parts of a sonde, improved according to the teaching of this invention. Very little information will be provided regarding the normal electronic circuits in the space 31. These are fully described in many configurations in the patent literature referred to earlier. Wherever the circuitry would be different in this invention, it is of course, fully described as will be clearly seen in these figures.

The sonde 30 comprises an outer shell 12 of conventional construction. In the lower portion, a cylindrical bulkhead 50 is fastened rigidly and sealed to the outer shell and has a downwardly extending axial post 42. Bearings (not shown) are provided on the post 42, so that a cylindrical tube or sleeve 34 can be rotated about the post 42 by means shown as the dashed line 38, controlled by motor 36. Such a rotating sleeve, as indicated, is common to the prior art design.

On the sleeve 34 is mounted a first T/RTS 46 with its outer face tangential to the surface of revolution, as the sleeve 34 rotates. This T/RTS 46 is periodically excited by electrical circuits which will be described, and transmits radially outwardly a sonic beam indicated by the numeral 16, which passes to the wall 22 of the borehole, which may be cased or uncased. Part of the sonic energy is reflected backwardly to the T/RTS. The conducting outer surface of the T/RTS is connected to a slip ring 44. A brush or electrical contact, stationary in the sonde, contacts the slip ring as the sleeve rotates and transmits on the lead 46′, the electrical scan signal reflected from the wall of the borehole. Rotary transformers can equally well be used in place of slip rings.

In the normal design of a borehole acoustic logger, or borehole televiewer (BHTV), only one such T/RTS 46 is provided, and the signal is collected from the slip ring 44 by the brush and passes by conductor 46′ to circuits in the electronic package 31, which are conventional. The processed signal then passes up through a transmission channel in the cable 20, which is normally a pair of conductors, to the surface, where it is utilized.

In this invention, at least a second T/RTS is mounted on the rotating assembly comprising the sleeve 34, etc. It is energized in a manner similar to that of the T/RTS 46 and produces an electrical scan signal (ESS), which goes by means of the lead 48′ to the electronic package in space 30 and to the surface in a manner similar to that of 46′, as will be discussed in greater detail in connection with FIGS. 3, 5, etc. Various combinations of multiple T/RTS arranged in a common horizontal plane, equally spaced circumferentially, can be provided which will provide certain benefits. Also, the multiple T/RTS can be provided in a longitudinal array, whereby other benefits can be realized, or in some combination of circumferential and longitudinal arrays.

One possible electronic circuit that might be used with the apparatus of FIG. 2 is illustrated in FIG. 3. Here the two T/RTS 46 and 48, labelled A and B respectively, are rotated by the means 38, as previously described, by the motor 36. The rotating slip rings are shown as 44, three of them are shown, two of them are connected internally to the T/RTS 48 and 46 respectively, the third slip ring is connected to a compass unit 60, which is well known and provides a member which remains in a fixed azimuth as the sonde moves vertically in the hole. On each rotation of the rotating assembly 34, an electrical pulse signal is provided as a selected point on the rotating assembly passes the constant azimuth angle of the compass. This can be a magnetic compass, which might be useful in logging an open hole, or a gyro compass, or its equivalent, as would be well known in the art. By means of the signal received from 60 that passes internally to the slip ring, and by the collector to line 60′, the orientation of the sonde with respect to an absolute azimuth such as north, can be determined. Thus, it can be represented on north/south or east/west displays, etc.

The manner in which the T/RTS are used to probe the wall of the borehole is old and well known, but is illustrated in FIG. 3 for completeness as to the electrical circuits in the upper right-hand portion of the FIG. 3. A power supply at 84 supplies power through resistor 162 to capacitor 86 that passes through the primary 88 of a transformer, and from junction 90 goes to a ground 78, which is connected to the negative potential of the power supply. A triggered rectifier, or gate control rectifier, 80 is connected between the potential 84 and the ground 78.

There is a timing means 74 which is conventional, operated by a clock of constant frequency, and including a counter means, such that at a selected time a signal pulse can be placed on line 75 to the trigger connection 82 of the controlled rectifier 80. When the trigger pulse arrives, the capacitor having been previously charged to the full potential of 84, now discharges through the rectifier 80 to the ground and this large current passing through the primary 88 of the transformer generates a corresponding voltage in the secondary 89 of the transformer, which goes by line 92 to the line 68, which can be connected to one or the other of the two T/RTS 46 or 48, as selected by the switch 62.

The switch 62 can be as simple as a relay, which is controlled by a potential on line 64; that is, controlled by means of a signal from the surface through one of the multiple conductors of the cable 20, as is well known in the art. Consider that the pulse of high voltage is delivered by line 92 to the line 48′, which means it is delivered to the T/RTS 48 and the transmitter puts out a pulse of sonic energy of selected amplitude and frequency. This propagates outward radially through the mud in the annulus of the borehole (or liquid of selected composition), to an obstruction, such as the surface of the casing. Here, part of the sonic energy is reflected and passes backward over the same path to the T/RTS 48, where it generates a corresponding received signal, or electrical scan signal, which comes back from the T/RTS 48 through line 48′, through the switch 62, to the box 66, which is marked S. Box 66 is a switch of a particular nature which is used for cutting off the receiving amplifier 70 from the line 68 during the period that the high voltage is on the line 92 to generate the transmitted sonic pulse.

The frequency of the transmitted sonic signal may be as high as 1 Meg. HZ, or higher, and far too high to transmit over the transmission channel of the conventional logging cable. It is, therefore, necessary to pass this through a signal detector 67, which converts the high frequency ESS to a relatively low frequency unidirectional analog signal, which can be transmitted over the cable. Thus, at a selected short time delay after the pulse is sent from line 92 to 48 and transmitted into the liquid, the connection from line 68 through the switch 66 and line 68′ to the amplifier 70 is now connected, and the amplified reflected signal is passed by line 72, which is a high frequency transmission channel for transmitting the ESS through the cable to the surface. The timer 74 applies, through 76, the necessary gating potential to the switch 66. This can be as simple as an AND gate, which is open during the time that the potential is applied to 92, and is closed shortly after that potential disappears.

Figure 4:
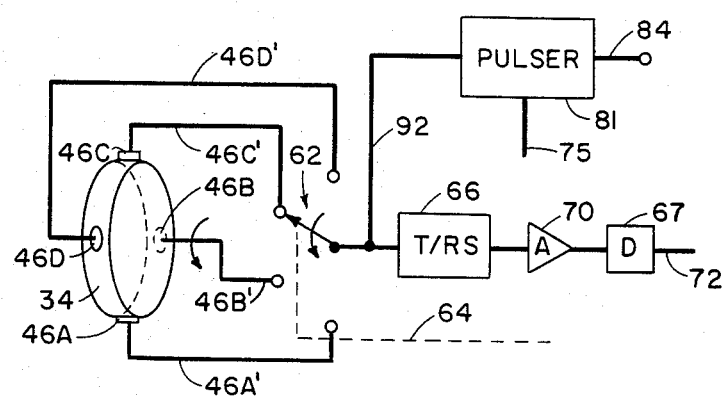
FIG. 4 is an extension of portions of FIGS. 2 and 3, illustrating how four separate T/RTS can be mounted on the rotating assembly and can be connected as desired to the pulser and to the cable.

Referring now to FIG. 4, here is shown schematically a rotating assembly 34, having four separate T/RTS 46A, 46B, 46C and 46D, instead of two as shown in FIGS. 2 and 3. These are arranged in the same transverse plane, perpendicular to the axis of rotation. Each one is connected by conductors 46A′, 46B′, 46C′, 46D′, to a multi-point switch 62′ which is patterned after the switch 62 of FIG. 3, controlled by signal over dashed line 64. A pulser, identical in all respects to the pulser of FIG. 3 shown in the dashed box 81, has three terminals, one being provided with power 84, another providing the power output on lead 92, to transmit a sonic signal, and a third lead 75, which provides a timing signal to the pulser. Although not shown, the lead 75 would got to a timing device, such as 74 of FIG. 3, which would also be connected to time the transfer switch 66 marked T/RTS in FIG. 4. The output of the T/RTS would then go through an amplifier 70, through a detector 67 to the transmission channel 72 of the cable 20 as shown in FIG. 3.

Figure 5:
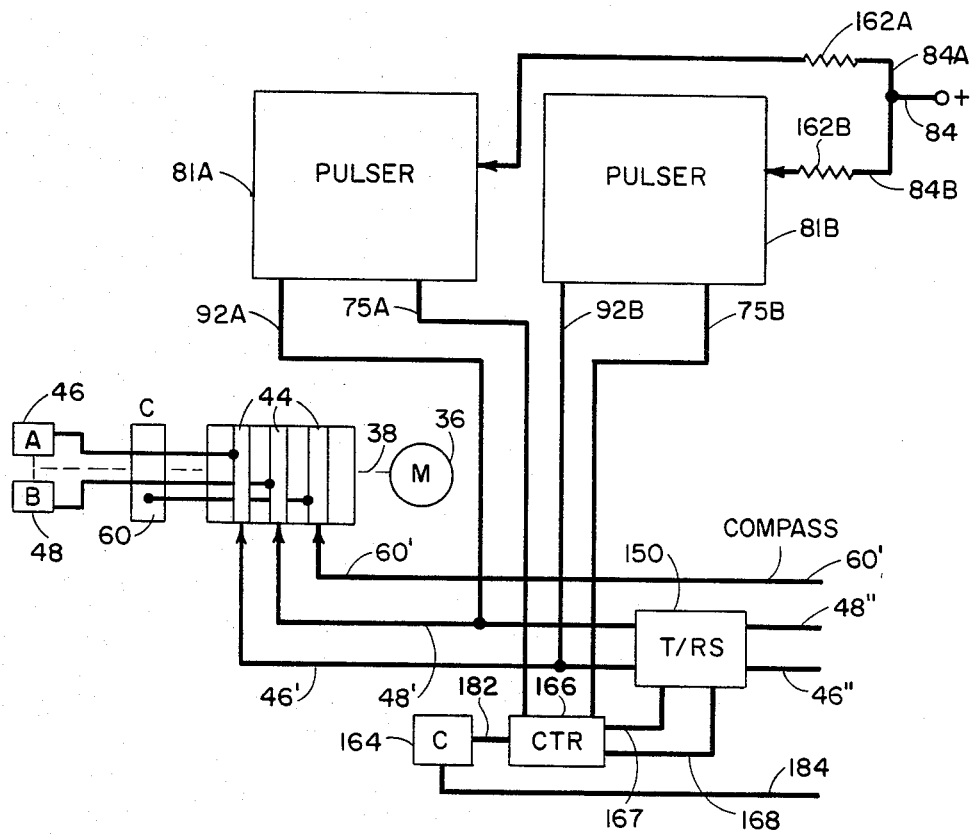
FIG. 5 is an extension of FIG. 3, illustrating the use of multiple pulsers, one for each of the separate T/RTS so that parallel output scan signals are provided simultaneously.

Earlier it was pointed out that any number of T/RTS, as desired, can be provided on the rotating assembly although only two were shown in FIG. 3 and only a single pulser was shown. In FIG. 5 a similar circuit is provided in which separate pulsers 81A and 81B are provided so that each of the T/RTS can be operated separately from the others.

In FIG. 5 each of the pulsers 81A and 81B are supplied by power from the supply 84 through separate leads 84A, 84B, and through separate resistors 162A and 162B. The timing signal comes from the counter 166, which is supplied with a clock signal from a clock 164 through the line 182. The counter, or control 166 also provides another signal output on leads 167 and 168 to the transmit/receive switch 150. The switch 150 disconnects the output leads 48" and 46" whenever the pulser signal is on the leads 46' and 48', which are connected through slip rings to the two transducers T/RTS 46 and 48 respectively.

Thus, with the apparatus of FIG. 5, two simultaneous sonic signal transmissions are being carried on, and the received signals are being transmitted through lines 48" and 46". The signals on these output lines can go directly to the cable if there are two separate transmission means. However, they can be combined, as will be described in connection with FIGS. 6 and 8 if there is only a single transmission system in the cable. As also shown in FIG. 3, and as fully explained in the prior art and in my co-pending application, Ser. No. 242,497, a compass, preferably a direct reading compass, such as a flux gate compass, for example, or other available compasses provides a signal pulse on output line 60' whenever the scanning T/RTS crosses a line directed to the north. The pulsers are timed so that the transmission pulses to the multiple T/RTS are synchronized.

This application is devoted to the processing of multiple scan signals, their transmission to the surface, and their handling at the surface. Since their transmission involves the logging cable, it might be desirable to look at the subject of the cable, which is the only means of communication between the sonde and the surface.

The logging cables that are utilized for operating the borehole televiewer are generally the same cables that are used for many other types of sensing apparatus, which are used for the logging boreholes and for the detection of various properties of the subsurface formations. In the logging of electrical resistivity, self-potential, and other types of electrical phenomena, the signals are of much lower frequency than they are in the borehole televiewer. A cable with an ordinary conductor pair for transmitting the signals is fully adequate. It is generally believed that the commercial logging cables in use at the present time, which may be from 20,000 to 30,000 feet in length, will adequately handle signals in the range of 50 to 100 kilohertz (KHZ) or kilobits per second.

The desired resolution of the scan signals that are transmitted to the surface may be set down as the following: In the measurement of caliper or the distance of penetration of the sonic signals through mud and the rock wall of the borehole, the minimum resolution desired would be to 0.05", and 256 units of this would cover a radial distance of penetration of about 13 or 14".

In the measurement of azimuth the conventional timing is for 360 transmission pulses in a rotation of 360° giving a minimum angular resolution of 1°. In the measurement of signal amplitude, a six-bit digital value for amplitude would indicate a minimal resolution of about $1\frac{1}{2}\%$.

To transmit the scan signals with these minimum resolutions would take $256 \times 360 \times 6 \times 3$ (revolutions per second) or 1.6 million bits per second. With such a high data rate, it would obviously be impossible to transmit a complete sonic scan signal by digital transmission, although digital transmission would provide more precise amplitude transmission. While there are available in industry high frequency transmission channels, such as coaxial cables and fiber optic channels, these are not generally available today in logging service. In the future it is very likely that they will be available, in which case the data rates could be much higher, such as would adequately handle complete scan signal digital transmission.

In my co-pending application Ser. No. 242,497, I pointed out that there is distinct advantage in having multiple T/RTS, such as two T/RTS, of different frequencies. If one T/RTS is in the high frequency range, and the other in a lower frequency range, the precision of amplitude measurements at short distances from the transmitters would be available with the high frequency unit, and a greater depth of penetration into the rock would be available with the low frequency transducers.

One method of handling this type of signal would be to first delay one with respect to the other, until the two scan signals are in phase, and then gate the high frequency scan signal for a certain selected time interval, and then gate the lower frequency scan signal. By this means, a single analog signal can be transmitted over the present cables very satisfactorily and still utilize the benefit of two T/RTS.

Another way of utilizing the present cables effectively with more than one T/RTS is to process the analog scan signals in the sonde to determine the amplitudes of the reflected signals, and the corresponding radius or caliper, at the time of the return signal. These two quantities can be expressed digitally in a relatively few bits, so that as many as four such pairs of signals could be transmitted sequentially, as by multiplexing, over the existing single analog transmission circuit in the conventional cables.

One type of present logging cable utilizes seven conductors, of which two would be utilized for the transmission channel and the other four would be used for control, power supply, etc. However, it could be possible to use four of the conductors to provide two separate conductor pairs for analog transmission of the scan signals. If there are two analog transmission channels, two ESS from two T/RTS could be transmitted to the surface independently and simultaneously, as analog signals, in the conventional manner. Or the two transmission channels could provide for transmission of eight separate scan signals when processed to transmit only the amplitude of the reflected signal and the time of the reflected signal. With a pair of T/RTS of different frequencies, the amplitude of the high frequency reflection and caliper of the low frequency reflection could be combined for transmission.

Of course, where the multiple T/RTS are in the same horizontal plane and spaced circumferentially on the rotating assembly, they can individually be delayed in time until they are all in phase, and they can then be stacked to provide a signal of improved signal-to-noise ratio.

Another combination which would be very useful would be to provide two analog transmission circuits and to use two identical T/RTS on the rotating assembly, so that at the surface there would be two scan signals per revolution of the rotating assembly, and thus a shorter vertical spacing between scans on the display could be provided. Conversely, the sonde could be moved vertically at twice the normal logging rate, and still provide the precisely same log that would have been provided with the slower vertical logging rate, and a single T/RTS. Thus, by using two or more identical T/RTS, it would be possible to increase the rate of logging with the borehole televiewer by a factor of two, or three, or more, depending upon the number of T/RTS. This would provide a consequent cut in the time for providing a log. Since one of the major components of the cost of logging is for the idle rig time, this could be cut in half if two T/RTS were used, and so on.

What has been described so far is similar to material in my co-pending application, Ser. No. 242,497, and is provided as background information for what is to follow.

Earlier it was mentioned that by means of an apparatus to increase the frequency of the scan signals, say by a factor of two, two such signals could be transmitted over a single transmission channel cable, sequentially, in the same time that it previously took to transmit one of them. Of course, this would raise the maximum frequencies in the analog scan signals and might not be fully satisfactory. In such a case, it might be desirable to alter the minimum data requirements on one of the several measurements made. For example, it might be possible to transmit one sonic pulse on each of two T/RTS every two degrees of rotation of the rotating assembly, but alternating the signal from one T/RTS to the other. In this way, the separate ESS would be as normally transmitted, and two such scans made by two separate T/RTS could then be alternately transmitted over a single cable, each in more or less a conventional manner. Of course, another way of doing this would utilize the apparatus of FIG. 3, except that the switch 62, instead of being a slow mechanical switch, would be a very fast electronic switch capable of alternating connections at millisecond intervals.

Figure 6:
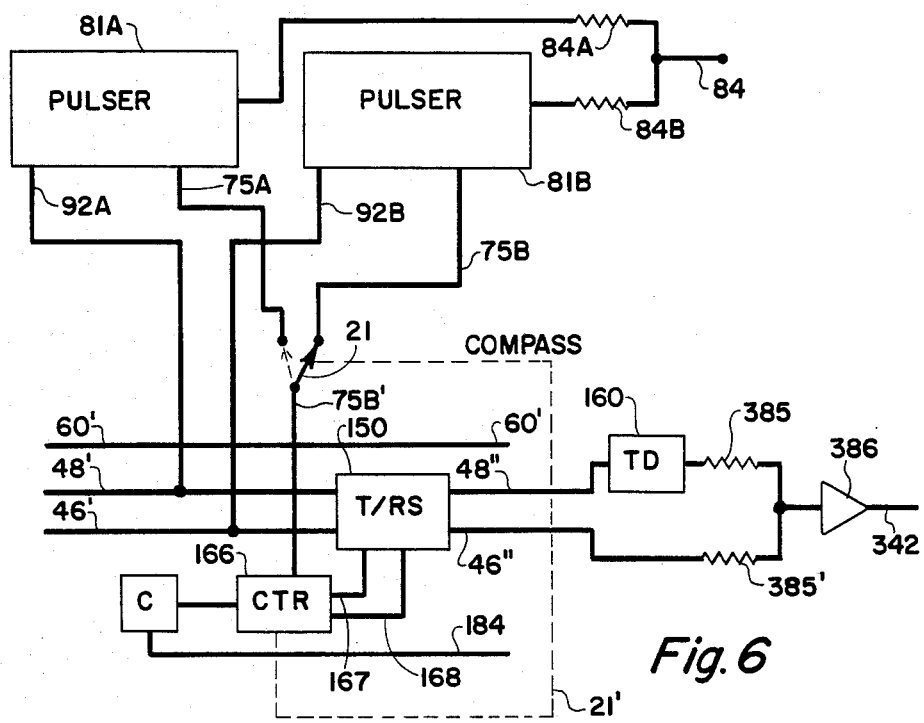
FIG. 6 is a modification of part of FIG. 5 showing alternate transmission of two or more electrical scan signals which may be from T/RTS of the same or different frequencies.

This would be a type of multiplexing in which the transmission time is shared between the two transducers sequentially. Of course, the two ESS must be placed in phase by adding time delay to one or the other of the ESS, as shown in FIG. 6, by the delay means 160. On this same basis, three or four or more T/RTS can be used sequentially with some lessening of the resolution.

Referring now to FIG. 6, which is a modification of FIG. 5 showing alternating rapid switching of the leads 75A and 75B by switch 21. It is shown as a separate switch for clarity but is most conveniently done in the counter 166. Switch 21 is shown as controlled by means 21' from the counter 166. Thus, instead of transmitting signals from both T/RTS, each (say at 1° of rotation), the first T/RTS is transmitted say at 1; line 402 of FIG. 7; then one degree later line 404, the other, but not the first; one degree later line 406 the first is again pulsed, and so on. Only one is pulsed at a time, each degree, to produce sequentially signals 412, 414, 416, 418, and so on.

Of course, the two transducers are not coincident, so the ESS from one of them, say on lead 48" is delayed by time delay means 160, for one-half period of rotation. This is done by the TD means 160 which can conveniently be one of the charge coupled devices which are commercially available on the market and need no further description. The two signals are then added by the resistor network 385, 385', and applied to amplifier 386 and transmission line 342.

Figure 7:
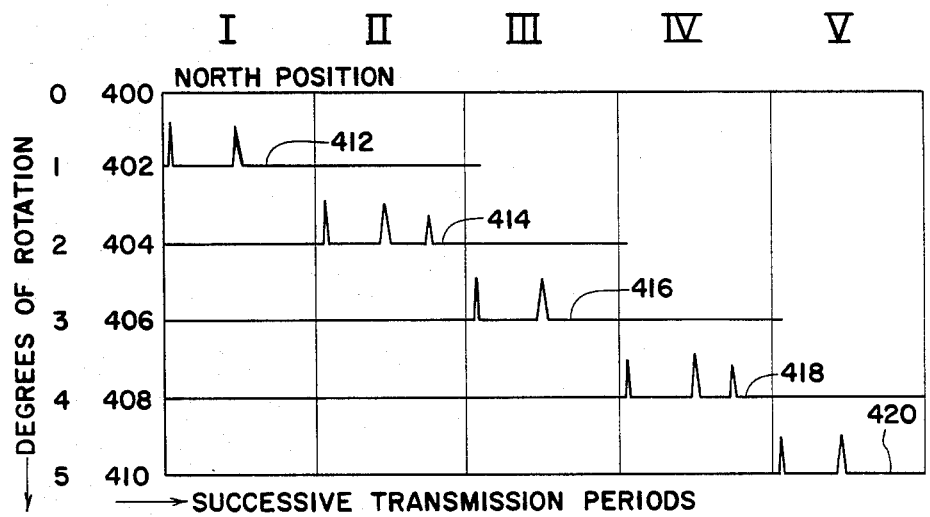
FIG. 7 illustrates the time scheduling of the alternate transmissions of the two or more electrical scan signals of FIG. 6.

As shown by FIG. 7, at any one instant there is only one ESS being transmitted so no gating means is required. The two ESS can be identical, that is, from identical T/RTS. However, they can be from different T/RTS, such as indicated in FIG. 7 showing a high frequency T/RTS on lines 1, 3, 5 and a lower frequency signal (having later return of energy) on lines 404 and 408.

Figure 8:
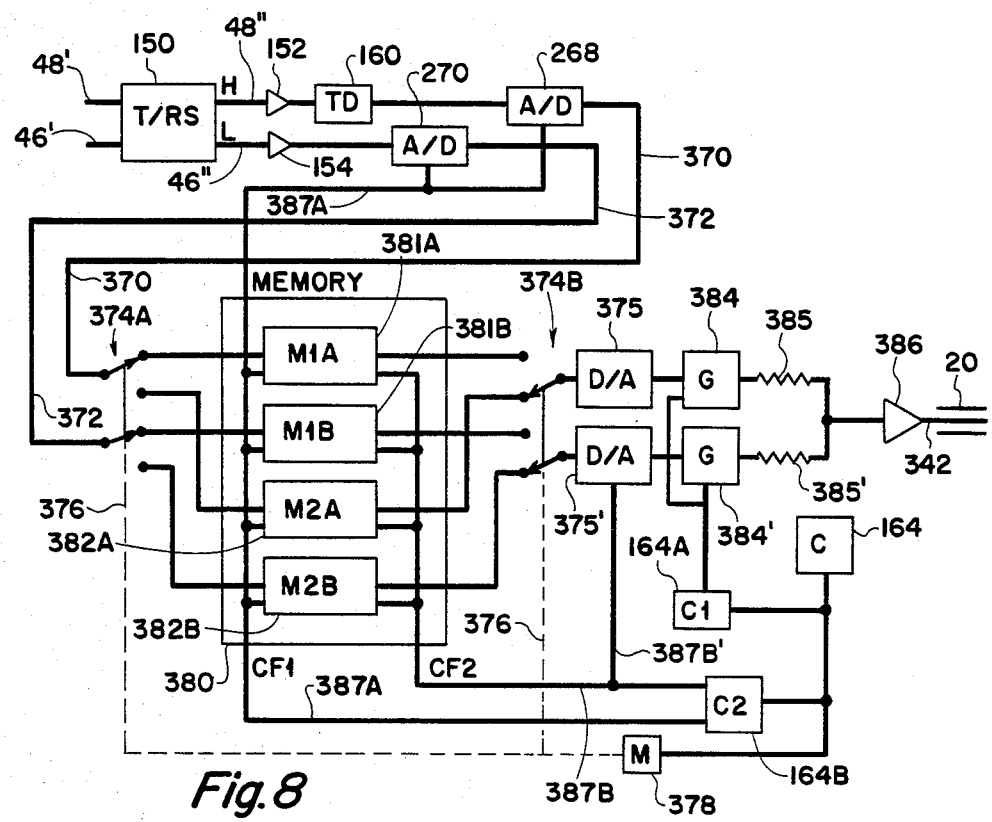
FIG. 8 illustrates one embodiment of apparatus for transmitting two or more simultaneous analog electrical scan signals by converting them to double frequency analog electrical scan signals for transmission over a single transmission channel.

With reference to FIG. 8, there is shown a memory unit 380, which has four separate memory components M1A, M1B, M2A, M2B, etc., numbered respectively 381A, 381B, 382A, and 382B. Two switches 374A and 374B are provided, one at the inlets to the memories, and the other at the outlets from the memories. The two leads 370 and 372 from the A/D converters 268 and 270 go to the two inlet switches 374A, which can alternately connect these two lines to the first pair of memories M1A and M1B respectively, and on command, can switch the two lines to the second pair of memories M2A and M2B, and so on.

The second switch 374B operates in a similar way but is 180° out of phase with the first switch 374A. In other words, when the leads 370 and 372 are connected to the first two memories, the switch 374B is connected to the second two memories, and vice versa. The outputs from the switch 374B go to D/A converters 375 and 375', then to gating means 384 and 384', through two equal resistors 385 and 385', where they are joined together and to a line drive amplifier 386, the output of which is connected to the transmission channel 342 of the cable. The bit rate from the analog-to-digital converters 268 and 270 is identical to the rate of bit loading into the memories through switch 374A and is controlled by a clock of frequency CF1 on line 387A, which comes from a clock C2 164B. The readout from memory through switch 374B is controlled by a higher frequency bit rate CF2, supplied on lead 387B from the clock C2. The bit rate CF2 is normally twice that of CF1. However, if three or more separate T/RTS are to be multiplexed on the cable, CF2 would be 3 or more times CF1.

There is a mechanism M, 378 driven by the base clock 164, which controls the switches 374A and 374B through means indicated by the dashed lines 376. These two switches are switched synchronously, but as mentioned, are out-of-phase. One is loading one pair of memories while the other is reading out of the second pair of memories, and so on. Also, the gating means 384 is controlled by a third frequency from clock C1, 164A. Each of the clocks C1, C2 and M are controlled by the base clock C, 164, and frequencies are divided down in a manner well known in the art. However, while the frequencies for each of the controls may be different, they are all synchronously related through C.

Figure 9:
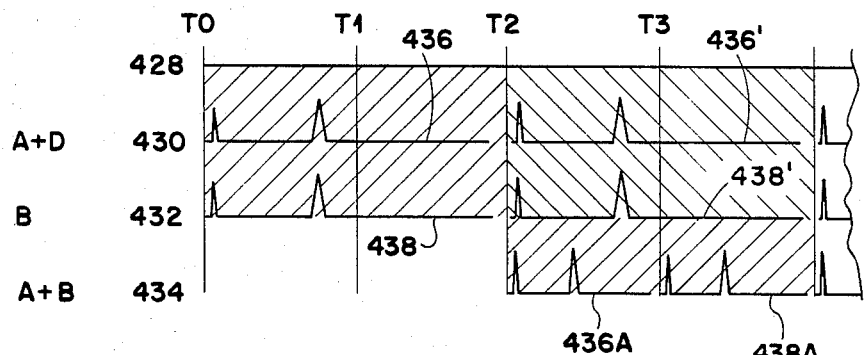
FIG. 9 illustrates the time scheduling of the two simultaneous electrical scan signals and the sequential transmission of the double frequency scan signals.

Refer to FIG. 9, and consider for purpose of illustration that the two T/RTS are coincident during rotation. They are not physically coincident, i.e., signal 436 occurs 180° prior to signal 432B, since they are spaced 180 degrees from each other. However, by time delaying signal 430 using time delay means 160 as has previously been explained, they can be made time coincident. Thus the delayed signal 436 from A on line 430, which is shown by (A+D) is in phase with the signal 438 from B on line 432. Both start at T0 and last till T2. The rectangle between lines 428 and 432, and T0 and T2 is shaded to indicate a first pair of memories M1A, M1B, into which these two ESS are loaded. The next two ESS 436' and 438' are loaded into the second memories M2A, M2B.

While the second ESS are being loaded, the previously loaded 436 and 438 are being unloaded, in sequence at double rate, as 436A and 438A. This sequence is repeated. When the second memories M2A and M2B are loaded, the next two will switch back to M1A and M1B and so on. Thus, while two separate scan signals are being recorded, simultaneously each one degree of rotation, the two scan signals are being transmitted at double frequency in sequence.

Of course, the two T/RTS can be similar, in which case it would be possible to log at double speed, without loss of detail, or they can be different (one high frequency and one low frequency) in which two separate logs can be recorded. Also, as taught in my co-pending application, Ser. No. 242,497, each of the ESS transmitted can be composite ESS, obtained by first gating a high frequency ESS to provide a short range scan, and then gating a lower frequency ESS for the longer range scan. Thus the two transmitted ESS could be provided from four separate T/RTS, two high frequency and two low frequency, and so on.

Returning to FIG. 8, the purpose of the gating means 384 is that the two scan signals which are read out at a double bit rate will be transmitted sequentially in the time that a pair of transmit-receive signals is loaded into the opposite pair of memories in parallel. Of course, only one of these 436A and 438A is read out at a time. For example, the switch 374B is connected as shown to the lower pair of memories. It may be desired, for example, that M2A should be transmitted first, and so that is read out at double bit rate and passed by the gating means 384 and through resistor 385 and amplifier 386 to the line 342 to the cable. When that is completed, the second scan signal in M2B controlled by gate 384' is read out at the higher bit rate, and is transmitted in a similar manner to the line 342 in the cable. By the time these two have been read out completely, the next pair of reflection signals have been loaded into the top pair of memories. The switches 374A and 374B are then operated, connecting the inlet switches to the second pair of memories and the outlet switches to the first pair of memories, and so on.

While I have shown in FIGS. 6 and 8 only two ESS, it will be clearly understood that this is shown by way of example, and not by way of limitation. Therefore, the apparatus can be extended to transmit 3, 4, or more simultaneous ESS by loading into memory at a first frequency, and reading out of memory at a frequency higher by a factor of 2, 3, 4, or more, and transmitting the read-out signals sequentially.

The important features of this invention are:

A. The use of multiple T/RTS so that in each revolution of the rotary assembly, two, three, or four, or more times as much information can be recorded on each revolution, without change in the basic mechanical system of the sonde.

B. This provides the opportunity to log at higher speeds without loss of essential information.

C. It also provides the opportunity to record multiple logs at the same or higher speed, providing additional information.

While I have shown and described methods and apparatus for processing multiple ESS so as to permit transmission of multiple ESS over presently available low frequency transmission channels to the surface, these signals could of course be transmitted to the surface without processing, where the cable provides single or multiple high frequency channels, and the same processing done at the surface. The point being that the processing is important in the utilization of the multiple ESS, whether done in the sonde, or at the surface. It is also important as a basis for transmission over low frequency channels. So, when I speak of processing ESS I mean either processing in the sonde or at the surface, as appropriate.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. A method of logging a borehole which comprises:
   (a) carrying out scanning operations around the wall of said borehole by directing sonic energy from at least a first and a second nonphysically coincident transmit/receive transducer system in a radial plane around the wall of said borehole and receiving returned reflected sonic energy from reflecting surfaces and producing at least a first and a second electrical scan signal representative of amplitude and transit time of reflected signals from reflecting surfaces at each of a plurality of downhole locations spaced around the wall of said borehole;
   (b) delaying one of said scan signals until the two scan signals obtained at a respective location representative of amplitude and transit time of reflected signals are coincident in time; and
   (c) transmitting said time coincident signals representative of amplitude and transit time of reflected signals to the surface.

2. The method as in claim 1 in which said first and second scan signals are obtained by operating two transmit/receive transducers of the same frequency.

3. The method as in claim 1 in which said at least two scan signals are obtained by operating two transit/receive transducers of different frequencies.

4. The method as in claim 1 in which said transmitting comprises the steps of:
   (a) converting said at least two scan signals at each location to a higher frequency electrical analog signals; and
   (b) transmitting said higher frequency signals to the surface.

5. The method as in claim 4 in which said step of converting comprises the steps of:
   (a) digitizing said at least two scan signals at a first bit rate and storing said two digitized scan signals in memory; and
   (b) reading out of said memory said two digitized scan signals at a second bit rate higher than said first rate.

6. The method as in claim 5 in which said second bit rate is at least twice said first bit rate.

7. The method as in claim 5 including separate first and second memories, and including the steps of:
   (a) loading said at least two digitized scan signals into said first memory, then on the next repetition into the second memory, then into the first, and so on at a first bit rate; while
   (b) reading out said at least two digitized scan signals at a higher bit rate sequentially from said second memory, then said first memory, in opposite phase to said loading step.

8. A method of logging a borehole in a system having a separate cable normally run at a first rate having at least a first signal channel which comprises:
   (a) carrying out scanning operations around the wall of said borehole by operating at least a first and a second nonphysically coincident transmit/receiver transducer subsystem means: (T/RTS) removed from each other and carried by a sonde and directing sonic energy in a radial plane around the wall of said borehole and receiving return reflected sonic energy from reflecting surfaces and producing at least a first and a second electrical scan signal representative of amplitude and transit time of reflected signals at each of a plurality of downhole locations, spaced around the wall of said borehole;
   (b) delaying one of said scan signals until two scan signals obtained at a respective location and representative of amplitude and transit time of reflected signals are coincident in time;
   (c) transmitting said time coincident signals representative of amplitude and transit time of reflected signals to the surface; and
   (d) recording said at least two time coinicident signals while traversing the borehole with said sonde at a second rate which is higher than said first rate.

9. The method as in claim 8 in which said two T/RTS are of the same frequency.

10. The method as in claim 8 in which said two T/RTS are of different frequency, and including the added steps of:
    (a) separating successive scans of scan signals from said two T/RTS;
    (b) recording said successive scans of scan signals from a first T/RTS as a first log; and
    (c) recording said successive scans of scan signals from a second T/RTS as a second log.

11. The method as in claim 8 in which said second rate is twice said first rate.

* * * * *